United States Patent Office 3,434,909
Patented Mar. 25, 1969

3,434,909
DEVICES FOR THE CONTINUOUS MANUFACTURE OF TILING SHEETS
Louis Constant Joseph Lescroart, 36 Rue du Cateau, Caudry, Nord, and Pierre Louis Michel Marlot, Banteux, Nord, France
Filed Apr. 5, 1966, Ser. No. 540,322
Int. Cl. B32b *31/26*
U.S. Cl. 156—552                          6 Claims

ABSTRACT OF THE DISCLOSURE

Moving steel strips contact the lateral edges of mesh backing material moving the mesh to a transfer roller to apply adhesive, then into contact with tiles moving at the same speed, then through a curing oven. As the strips provide lateral constraint, the mesh backing will be undeformed when the adhesive dries. The backing can be woven or non-woven mesh.

---

This invention relates to improvements in and to the devices for the continuous manufacturing of tiling sections or panels in which the tiles arranged in a predetermined pattern are mounted on a backing sheet of lacunary structure.

In the panels of this kind the mounting sheet is adhered to the back faces of the tiles and is bound in turn to the floor or wall base, whereas because of its openings, it allows the cement or grouping mixture to fill up the intertiles crevices during the installation and setting of the tiling panels.

The device of this invention is characterized in that it comprises a tiles conveyor with the tiles pieces properly prearranged laid thereupon so as to form a tiles assembly and a backing sheet conveyor comprising keeping means moved laterally on each side of the tiles conveyor and synchronously with it, said backing sheet conveyor being adapted to keep both edges of the backing sheet properly adhesive coated at least on its lower face, so as to keep it against the upper face of the tiles assembly for a sufficient time to ensure the curing of the adhesive.

According to a first embodiment of the present invention, the tiles assembly is laid on an endless moving conveyor consisting of a continuous belt, the backing sheet is an open mesh fabric or a net continuously drawn from a bolt, each edge of this backing sheet being kept by a couple of strips of steel bands endless moving on a set of pulleys, said strips or steel bands leading the backing sheet on an adhesive coating roller and below against the upper surface of the tiles assembly for a sufficient time to ensure the curing of the adhesive.

According to a second form of embodiment of the present invention, the backing sheet is a non woven fabric made of warp yarns and/or weft yarns the latter being unrolled from spools secured to a rotative distributor and wrapped around two steel bands moving endless in the middle of the rotative distributor; the non woven fabric is carried along the machine by the steel bands which form a conveying mechanism and after being coated with adhesive on an adhesive distributor roller is led against the back surface of the tiles for a sufficient time to ensure a proper bond between the fabric and the tiles.

The present invention is illustrated by way of examples in the accompanying drawings in which.

Figure 1:
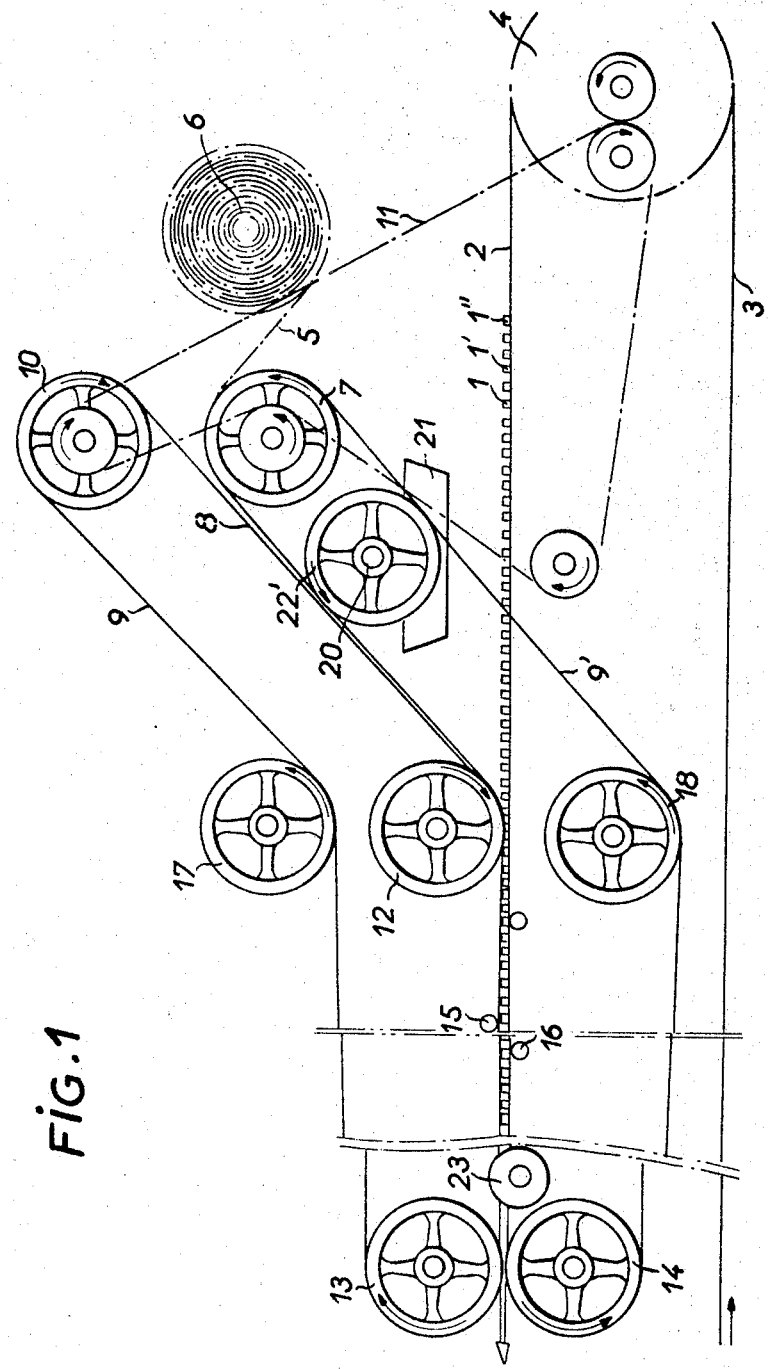
FIG. 1 is a diagrammatic view of a machine according to the first form of the invention and in which the tiles assembly is mounted on a mesh fabric backing.

According to the first method shown in FIG. 1, the individual tile pieces 1, 1', 1" are pre-arranged on a continuously moving endless conveyor 3 which is eventually provided with proper cavities for locating the individual tile pieces and moved by the driving roller 4. The sheet backing 5 is a fabric of lacunary structure like an open meshfabric or a net; it is unrolled from the bolt 6 and its edges are kept and led by two couples of steel bands 9 and 9' which are moved by the driving pulleys 7 and 10 and form the backing conveyor, synchronous with the tiles conveyor.

The steel bands are eventually provided with anti skid lining and after their joining together they are firmly stressed by the pulleys 12, 13 and 14 and the rollers 15, 15' covered with rubber cushion; the pulleys 17 and 18 allow the steel bands to return to the driving pulleys 7 and 10.

From the commissure 8 of the steel bands 9 and 9', the backing fabric 5 is maintained by its edges between the steel bands and led on the rotatable cylindrical roller 20 which dips into the adhesive container 21 and is moved by the steel bands; the roller 20 applies the adhesive on the surface of the fabric corresponding to the surface of the tiles assembly.

The pulley 12 leads the steel bands and the backing fabric against the back of the tiles assembly laid on the endless moving tiles conveyor.

The backing fabric synchronous with the tiles assembly is moved through heating chamber for a sufficient time to allow the adhesive to dry and the bond between the fabric and tiles to be developed. After this drying the edges of the fabric are properly cut for instance by two rotative blades 23. This machine gives a continuous strip of tiles mounted on sheet backing and likely to be cut into individual tiling sections of suitable dimension.

Figure 2:
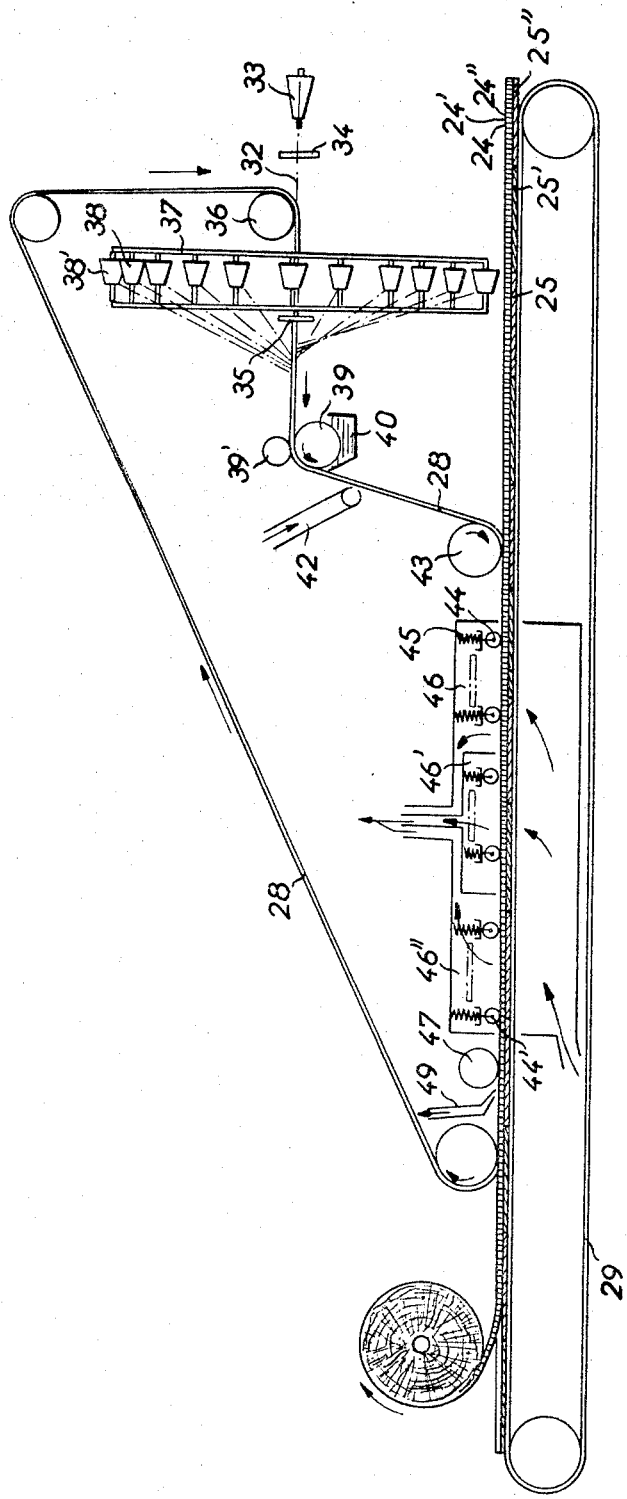
FIG. 2 is a diagrammatic view of a machine according to the second form of the invention.
Figure 3:
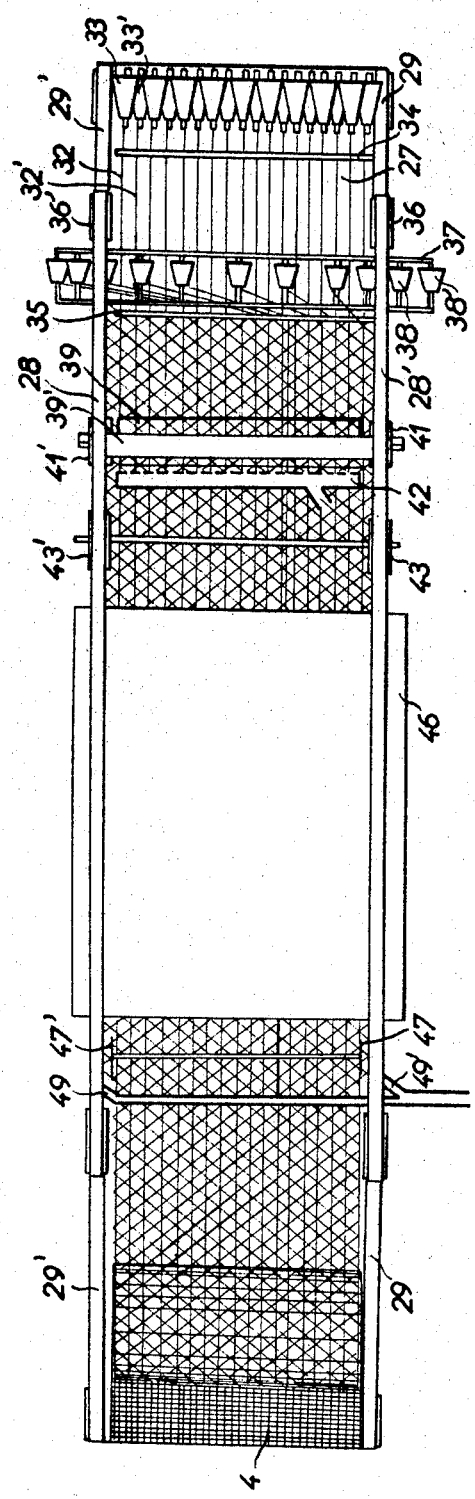
FIG. 3 is a plan view of the machine shown in FIG. 2.
Figure 4:
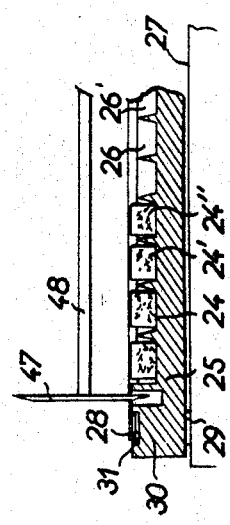
FIG. 4 is a side elevation of a gridwork with the individual tile pieces placed therein and showing the backing mounted on the back side of the tiles.

According to the second form of the invention illustrated in FIGURES 2, 3 and 4, the tile pieces 24, 24', 24" a.s.o. are laid on conventional gridworks or so-called "mounting boards" 25, 25', 25" provided with dividers 26 and cavities 26' for locating the individual tiles. The gridworks are placed behind each other so as to form a continuous bed, on a table 27; the gridworks 25, 25' and 25" with the tiles assembly laid thereupon are moved along the machine by two couples of upper steel bands 28 and 28' and lower ones 29 and 29'; the upper steel bands 28 and 28' will hold and lead the backing fabric, after a proper adhesive coating of the same, against the tiles assembly.

To ensure a suitable and firm prehension of the gridworks between the steel bands, the edges of the gridworks are provided with a groove 31 in which the upper band 29 is placed.

In this second form of embodiment of the invention, the backing sheet is a non woven fabric in which the warp yarns 32, 33 are unrolled from the spools 33, 33' (or from a weaver's beam); the sheet of warp yarns is moved through the reeds 34 and 35 and then is joined on each edge by the steel bands 28 and 28' inserted in the pulleys 36 and 36'; the sheet of warp yarns and the bands 28 and 28' are moved through the weft yarns distributor consisting of a wheel 37 bearing the bobbins 38 and 38'; due to the rotation of the wheel the weft yarns are wound off the bobbins 38 and 38' and wrapped around the moving bands 28 and 28' and laid diagonally and successively on the upper end the lower faces of the warp yarns sheet, so as to form a unique sheet of non woven yarns.

Optionally a second sheet of warp yarns is unwound from a weaver's beam placed below the waft yarns distributor and joins the first sheet to be both integrated when passing between the rotatable cylindrical rollers 39 and 39'.

The yarns used to constitute the warp and weft sheets are of any kind; however, the synthetical and mineral (glass fibre) ones will be preferred since they are inert to chemical agents, water-resistant and do not imply serious danger of shrinkage or moisture due to wet conditions of stockage.

The non woven backing fabric is moved between the rollers 39 and 39'; the lower one 39 is partially immersed in the adhesive container 40 and applies the adhesive to the backing fabric whereas the upper roller 39' keeps the backing fabric in constant contact with the lower roller and causes the excess in the adhesive applied on the lower roller 39 to be rejected so as to ensure a constant adhesive coating of the baking fabric.

Immediately after the fabric has been applied with the adhesive, a transversal blower 42 is provided in order to break the adhesive films which could fill the windows between the yarns.

The steel bands 28 and 28' guided by the pulleys 43 and 43' lead the adhesive coated backing fabric against the back side of the tiles laid on the gridworks 25, 25', which are moved by the said steel bands 28 and 28' so that the tiles assembly and the backing fabric are put forward at the same speed; in fact, the edges of the gridworks are pinched between the upper 28 and 28' and lower 29 and 29' steel bands (the latter being optionally provided with a cushion in a proper material like sponge rubber). The upper and lower bands are synchronous and press the edges of the gridworks by means of the friction rollers 44, 44' stressed by adjustable springs in accordance with the thickness of the gridworks.

The tiles assembly laid on the gridworks and the adhesive coated fabric positionned thereupon advances through the heating chambers 46, 46' and 46" in which the adhesive is dried and fastened so as to permit the backing fabric to be firmly adhered to the back sides of the tiles. Thereafter, the circular blades 47 and 47' following the narrow grooves 48 provided on each edge of the gridworks cut the weft yarns off the border of the tiles assembly, the yarn wastes being eliminated by two suckers 49 and 49'. The tiles sheet mounted on the non woven fabric and firmly secured thereto since the yarns are adhered to each other and to the back sides of the tiles, is then removed from the gridworks and can be rolled up, optionally the tiles sheet can be cut into individual sheets of suitable dimension to constitute unit tiling sections.

In either form above specified and in the case it is desired to obtain tiling sections in which the individual tile pieces are mounted jointly and without any inter tiles crevices the mounting fabric will be chosen so as to be likely to be shrunk under physical or chemical action; after drying and curing of the adhesive and the tiles being secured to the mounting fabric the same will be subject to a multi-directional shrinkage resulting in the tiles joining each other without inter tiles spaces.

What we claim is:

1. In a device for joining tiles to a yielding backing sheet having: means for moving the tiles along a predetermined path, and means for applying an adhesive material to the backing; the improvement comprising means located at the lateral edges of the backing for laterally constraining and longitudinally moving the backing into contact with the applying means, then into coincidence with the tile path in synchronism therewith, whereby the tiles are secured to the backing without deformation thereof.

2. A device in accordance with claim 1, wherein the backing comprises a sheet of lacunary structure, and the edge means comprises at least two moving strips; and further comprising curing means for the adhesive located near the coincident portions of the tile and backing paths.

3. A device in accordance with claim 2, wherein the lacunary backing comprises an open mesh fabric, the edge means comprises two pairs of steel strips and two sets of pulleys, each pulley pair located at and along a respective lateral side of the backing with said strips supported thereon; and further comprising a stock roller to feed backing material into the edge moving means.

4. A device in accordance with claim 2 further comprising: a plurality of warp yarn spools; warp threads mounted on each of the warp spools and longitudinally of the strips; a rotatable wheel having its rotatable axis longituidnally aligned; a plurality weft yarn spools rotatably mounted to the wheel; weft threads mounted on each of the weft spools and diagonally of the strips; whereby the wheel is rotated and the weft and warp threads drawn off to the respective spools thereby producing a non-woven backing.

5. A device in accordance with claim 2, wherein the curing means comprises a heat oven.

6. A device as in claim 1, wherein the tile moving means comprises a continuous belt having gridwork dividers to align the tiles and grooves to receive the strips.

References Cited

UNITED STATES PATENTS

| 1,315,166 | 9/1919 | Semashko | 29—211 |
|---|---|---|---|
| 3,033,739 | 5/1962 | Klein | 156—561 |

EARL M. BERGERT, *Primary Examiner.*

M. L. KATZ, *Assistant Examiner.*

U.S. Cl. X.R.

29—211; 156—561, 562